United States Patent [19]

Wagensonner

[11] 4,176,927
[45] Dec. 4, 1979

[54] APPARATUS FOR DECODING INFORMATION STORED IN CONTAINERS FOR PHOTOGRAPHIC FILMS

[75] Inventor: Eduard Wagensonner, Aschheim, Federal Republic of Germany

[73] Assignee: AGFA-Gevaert, A.G., Leverkusen, Fed. Rep. of Germany

[21] Appl. No.: 868,828

[22] Filed: Jan. 12, 1978

[30] Foreign Application Priority Data

Jan. 21, 1977 [DE] Fed. Rep. of Germany ........ 2702989

[51] Int. Cl.² ............................................. G03B 17/18
[52] U.S. Cl. ..................................... 354/21; 354/173; 354/289
[58] Field of Search ................. 354/21, 170, 171, 202, 354/217, 218, 289, 173; 352/92

[56] References Cited

U.S. PATENT DOCUMENTS

| | | | |
|---|---|---|---|
| 3,552,841 | 1/1971 | Michelson | 352/92 |
| 4,024,557 | 5/1977 | Aoyama et al. | 354/21 X |

Primary Examiner—Michael L. Gellner
Attorney, Agent, or Firm—Peter K. Kontler

[57] ABSTRACT

Photographic apparatus for use with cassettes wherein one side of the film is contacted by the carbon layer of a backing strip has two spaced-apart contacts which engage the other side of the film in line with the perforations. The contacts are connected with a signal generating circuit having a diode which emits light or ceases to emit light when both contacts simultaneously engage the carbon layer whose ohmic resistance is high and which then constitutes one resistor of a voltage divider. The contacts also engage the carbon layer behind the trailing end of the film whereby the diode furnishes a signal which indicates that the apparatus has exposed the last film frame. Alternatively, the apparatus has three electric contacts which bear against the other side of the film and two of which serve to effect the generation of a first signal in response to detection of a perforation. The third contact cooperates with one of the two contacts to effect the generation of a different signal (or a signal which is furnished by a different component) in response to engagement with the carbon layer behind the trailing end of the film.

15 Claims, 4 Drawing Figures

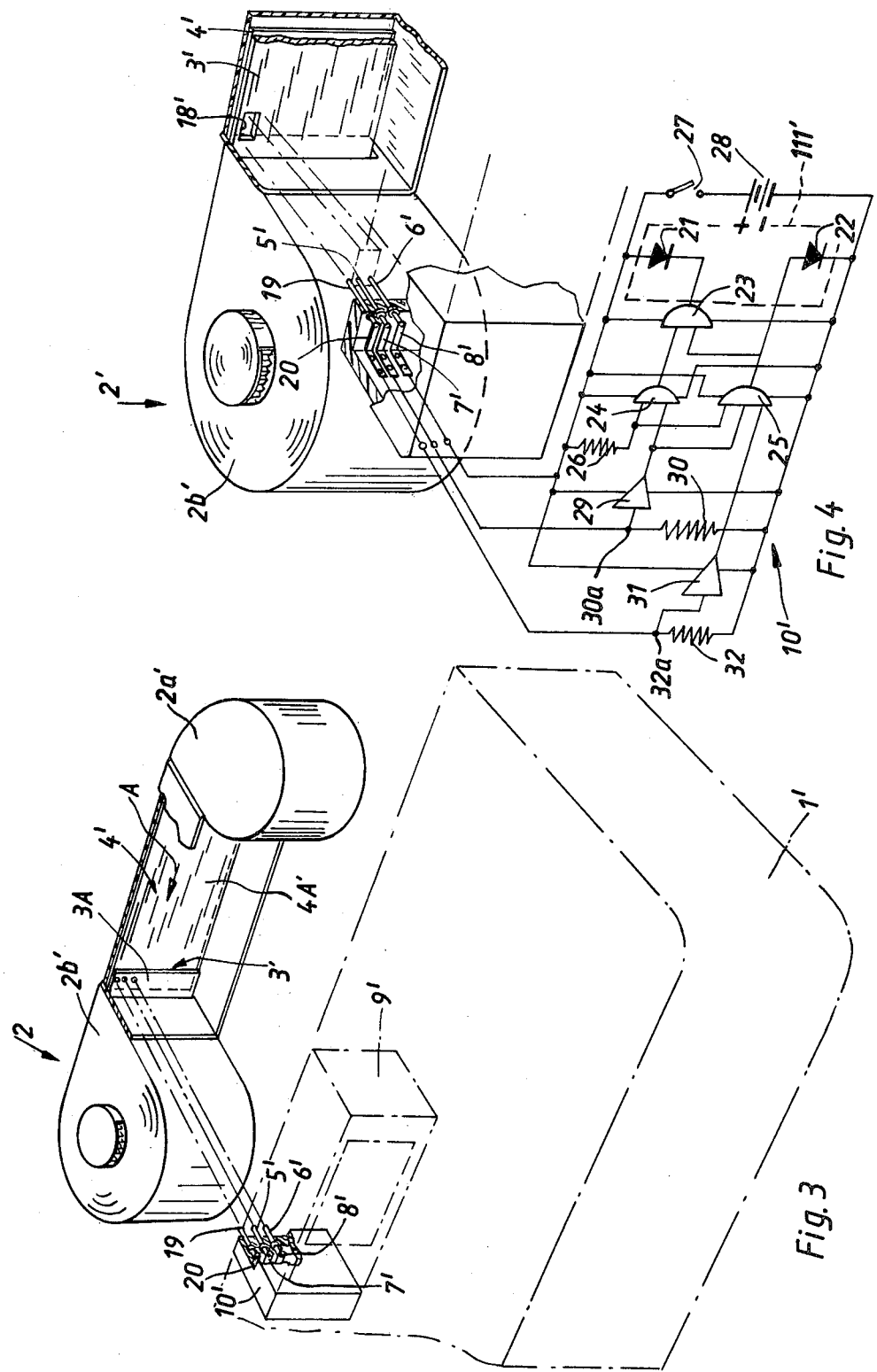

APPARATUS FOR DECODING INFORMATION STORED IN CONTAINERS FOR PHOTOGRAPHIC FILMS

BACKGROUND OF THE INVENTION

The present invention relates to photographic apparatus in general, and more particularly to improvements in photographic apparatus which are provided with means for detecting information pertaining to photographic films. Still more particularly, the invention relates to improvements in photographic apparatus wherein the information pertaining to photographic films therein is detected by electric contacts.

It is known to provide a photographic apparatus with a system which tracks the film, or a strip which is associated with the film, in order to detect information denoting the sensitivity of film. Such information is used for proper adjustment of exposure controls. As a rule, the film or the strip (the so-called backing strip which normally consists of paper and has an opaque layer adjacent to one side of the film to prevent untimely exposure of the photosensitive layer to light) is formed with a conductive track extending in the longitudinal direction of the film. The tracking system comprises two spaced-apart electric contacts which engage the track and are connected with the exposure controls. The conductivity of the track is a function of sensitivity of the respective film. A drawback of such photographic apparatus is that they must be loaded with an expensive film, i.e., with a film which (or whose backing strip) is provided with a track of electrically conductive material.

OBJECTS AND SUMMARY OF THE INVENTION

An object of the invention is to provide a photographic apparatus which can utilize conventional photographic films and which embodies a novel and improved system capable of decoding and evaluating information pertaining to the film which is confined in its chamber.

Another object of the invention is to provide the photographic apparatus with novel and improved means for decoding information which is stored in a cassette or an analogous receptacle of the type containing a web of photographic film and a backing strip for the film, and more particularly a backing strip which has an opaque light-intercepting layer abutting against one side of the film.

A further object of the invention is to provide information decoding means which is simple, compact and inexpensive and which can utilize at least some parts of conventional decoding means for use in cameras which employ films with electrically conductive tracks thereon or on the associated backing strips.

An additional object of the invention is to provide the photographic apparatus with novel and improved means for detecting information which is encoded in or on the film to denote certain characteristics or portions of the film and/or to facilitate the detection of the trailing end of the film (this is tantamount to an indication that the photographic apparatus has completed the exposure of the last film frame).

An ancillary object of the invention is to provide novel and improved tracking means for the film which is used in a still camera or in a motion picture camera.

A further object of the invention is to provide the photographic apparatus with novel and improved means for evaluating information which is stored on a photographic film, especially on a film having a row of perforations, one for each film frame.

Another object of the invention is to provide the photographic apparatus with novel and improved means for furnishing signals which denote the position and/or other characteristics of individual film frames and/or the completion of exposure of the last film frame.

The invention is embodied in a photographic apparatus wherein a web of photographic film is transported in a predetermined direction along a predetermined path, wherein a layer having a high ohmic resistance is adjacent to one side of the film, and wherein at least one portion of the film affords access to the layer from the other side of the film. The apparatus comprises tracking means which is adjacent to a predetermined portion of the film path and includes two spaced-apart electric contacts at least one of which engages the other side of the film in line with the aforementioned portion of the film and both of which simultaneously engage the layer when the film portion is adjacent thereto whereby that part of the layer which extends between the contacts (while the contacts simultaneously engage the layer) constitutes a resistor, and means for generating signals in response to simultaneous engagement of both contacts with the layer.

The layer is preferably opaque (i.e., it intercepts light), and the tracking means is preferably constructed, assembled and mounted in such a way that each of its contacts normally engages the other side of the film in the film path. Each contact can be biased against the other side of the film by a discrete spring or the like; alternatively a single spring (e.g., a leaf spring) can be employed to urge two or more contacts against the film.

The aforementioned portion of the film preferably includes or constitutes the trailing portion or end of the film, and the opaque layer extends rearwardly beyond the trailing end of the film so that the contacts simultaneously engage the layer when the trailing end of the film is advanced beyond the contacts. The signal generating means then furnishes a signal (e.g., a visible signal which can be seen by looking through the view finder) which denotes that the apparatus has completed the exposure of the last film frame. Alternatively, or in addition to furnishing visible (or, if desired, audible) indications, such signal can be used to arrest a motor which forms part of the film transporting means.

If the aforementioned film portion includes a row of perforations extending in parallelism with the longitudinal direction of the film, the contacts of the tracking means can further serve to detect successive perforations. To this end, the contacts are sufficiently close to each other to simultaneously extend through a perforation which is in register with the tracking means and to contact the opaque layer of the backing strip. The signal generating means then furnishes a signal (e.g., a visible signal) which informs the user of the apparatus that an unexposed film frame is in register with the picture taking lens. Alternatively, and if the perforations serve a purpose other than to facilitate the transport of photographic film by the length of a frame, e.g., to denote the sensitivity or other characteristics of the film, the signal generating means can furnish appropriate signals to the exposure controls of the photographic apparatus to insure the making of proper exposures.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary exploded perspective view of a still camera which embodies modified film tracking and signal generating means; and FIG. 4 is an enlarged perspective view of a detail in the still camera of FIG. 3 and a diagrammatic view of the signal generating means.

DESCRIPTION OF THE PREFERRED EMBODIMENTS

Figure 1:
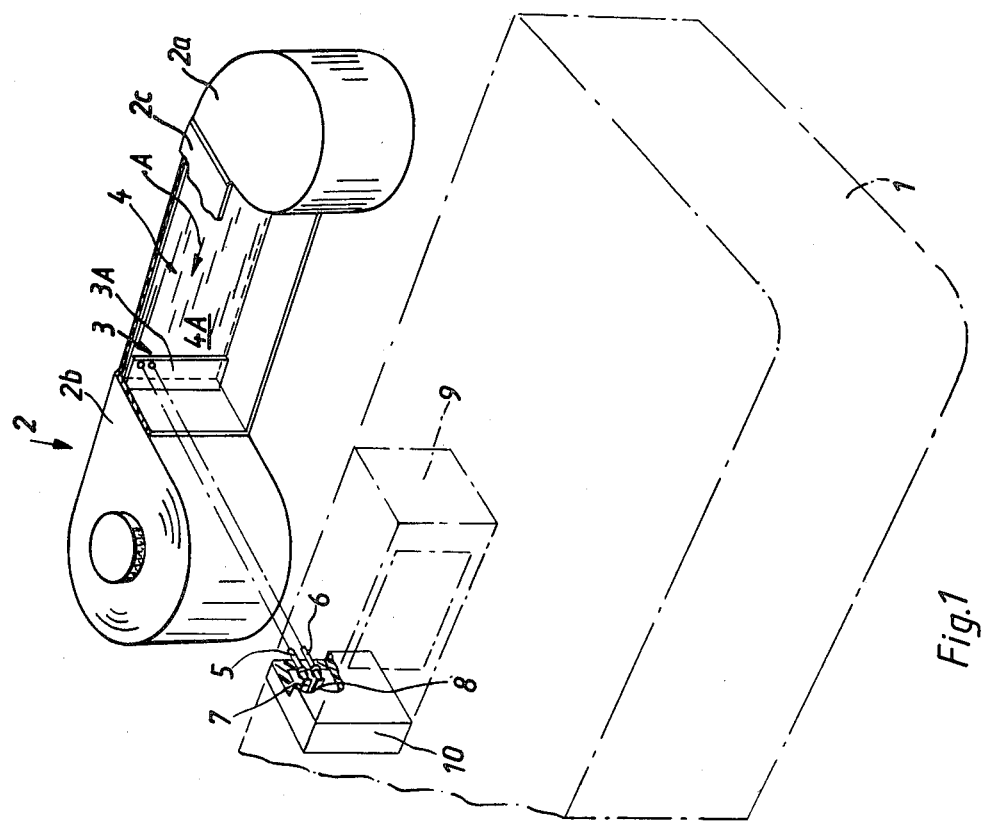
FIG. 1 is a fragmentary exploded perspective view of a still camera which embodies one form of the invention, the tracking means being in the process of monitoring the trailing end of a web of photographic film.

Referring first to FIG. 1, there is shown a portion of a photographic apparatus which constitutes a still camera. The apparatus comprises a housing or body 1 having a chamber (not specifically shown) for reception of a film container 2 here shown as a customary cassette having a casing a first section 2a of which contains a supply reel for unexposed frames of a web of photographic film 3, a second section 2b of which contains a takeup reel for exposed frames of the film 3, and an intermediate section 2c of which has a window enabling scene light to reach the foremost unexposed film frame in response to opening of the shutter (not shown). The cassette 2 further contains a strip of backing paper 4 having an opaque layer 4A of high ohmic resistance. Such layer may consist of carbon and is adjacent to one side of the film 3, namely, to that side which faces away from the picture taking lens in or on the casing 1. The arrow A indicates the direction of transport of photographic film 3 from the interior of the section 2a toward the interior of the section 2b. A platform 9 in the body 1 cooperates with the intermediate section 2c of the cassette 2 to locate the film 3 between the sections 2a and 2b in a predetermined plane when the cassette is properly inserted into the body 1. FIG. 1 shows that the strip 4 (and hence the layer 4A) extends rearwardly beyond the trailing portion or end 3A of the film, 3, i.e., the last frame of the film is already confined in the interior of the section 2b.

Figure 2:
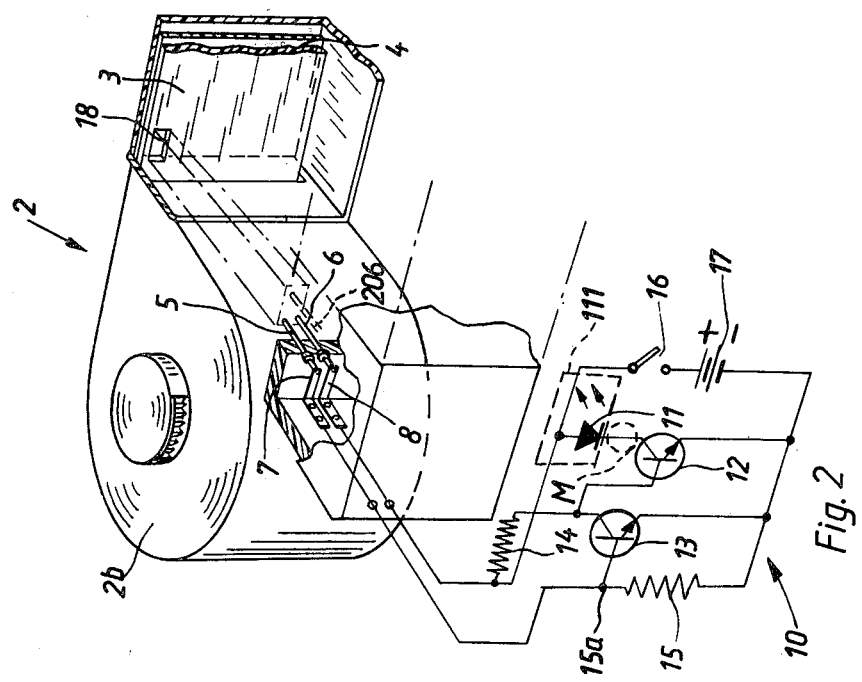
FIG. 2 is an enlarged perspective view of a detail in the camera of FIG. 1 and a diagrammatic view of the signal generating means, the tracking means being in the process of detecting an oncoming perforation of the film.

The front side of the film 3 (i.e., that side which faces away from the opaque layer 4A of the backing strip 4) is tracked by two spaced-apart electric contacts 5 and 6 which are respectively biased against the film by discrete leaf springs 7 and 8. The contacts 5, 6 and the biasing means 7, 8 are installed in the body 1 of the camera. The springs 7, 8 preferably consist of a suitable metallic material so that they constitute conductors which connect the contacts 5, 6 with certain components of a signal generating circuit arrangement 10 in the camera body. As shown in FIG. 2, that component or device of the circuit arrangement 10 which furnishes signals is a light-emitting diode 11 mounted in such a way that it is observable by looking through the view finder 111 of the photographic apparatus. The diode 11 is connected in the collector circuit of a first transistor 12 whose emitter circuit is connected with the negative pole of a battery 17 or another suitable energy source and whose base is connected to the collector circuit of a second transistor 13. The collector circuit of the transistor 13 further includes a resistor 14 which is connected to the contact 6 via leaf spring 8. The base of the transistor 13 is connected with an additional resistor 15 by way of a tap 15a. The tap 15a is further connected to the spring 7, i.e., to the contact 5. The contact 6 is directly connected with the positive pole of the energy source 17 in response to closing of a switch 16 which can be closed by hand or mechanically, e.g., in automatic response to starting of a film transporting motor or in automatic response to acutation of a film transporting lever or wheel.

That portion of the film 3 which is tracked by the contacts 5 and 6 has a row of equally spaced perforations 18 (one shown in FIG. 2) and such portion further includes the trailing end 3A. The distance between the film-engaging tips of the contacts 5 and 6 is less than the width of a perforation 18, as considered at right angles to the direction of film transport (arrow A). Thus, the tips of the contacts 5 and 6 can be said to be disposed side-by-side, as considered transversely of the direction of film transport. Consequently, and since the tips of the contacts 5, 6 engage the film 3 in line with the row of perforations 18, both tips simultaneously engage the layer 4A of the backing strip 4 when a perforation 18 enters that portion of the film path which is adjacent to the tracking means including the contacts 5 and 6. That part of the layer 4A which extends between the tips of the contacts 5 and 6 when such tips simultaneously engage the layer 4A constitutes a resistor. This resistor (i.e., a part of the layer 4A) forms part of a voltage divider which further includes the tap 15a and resistor 15. When the switch 16 is closed, the voltage divider energizes the transistor 13 and causes the transistor 12 to block. Thus, the diode 11 ceases to emit visible signals as soon as a perforation 18 moves into register with the tips of the contacts 5 and 6. The photographer who observes the diode 11 by looking through the view finder 111 is informed that a film frame is in accurate register with the picture taking lens of the photographic apparatus. It will be noted that the generation of signals by diode 11 involves an interruption of transmission of visible signals.

If the resistor 14 were connected in the emitter circuit of the transistor 13, the diode 11 would emit a visible signal when the layer 4A is simultaneously engaged by the tips of both electric contacts 5 and 6.

The diode 11 further furnishes a signal in automatic response to transport of trailing portion 3A of film 3 beyond the tracking means including the contacts 5 and 6. The tips of both contacts are then free to engage the layer 4A under the action of the respective springs 7 and 8 whereby the transducer 12 causes the diode 11 to cease the transmission of visible signals, i.e., to furnish a signal (absence of visible signal) which is detected by the user of the photographic apparatus and denotes that the apparatus has completed the exposure of the last film frame.

Instead of placing the tips of contacts 5 and 6 side-by-side (as shown in FIGS. 1 and 2), such tips can be placed one behind the other, as considered in the direction of arrow A. The distance between the tips of the contacts 5 and 6 is then less than the length of a perforation 18, again as considered in the direction of film transport from the interior of the section 2a toward the interior of the section 2b. This is indicated in FIG. 2 by broken lines, as at 206, i.e., the contact 6 can be installed ahead of the contact 5.

In addition to or instead of changing the condition of the light-emitting diode 11 of the signal generating circuit arrangement 10, the latter may serve to change the condition of a motor M (indicated by broken lines) which forms part of the film transporting means in the photographic apparatus. The motor M is preferably arrested whenever a perforation 18 moves into register with the tracking means including the contacts 5 and 6.

FIGS. 3 and 4 illustrate a portion of a modified photographic apparatus wherein all such parts which are identical with or clearly analogous to the corresponding parts of the apparatus of FIGS. 1 and 2 are denoted by similar reference characters each followed by a prime. The tracking means of the apparatus of FIGS. 3 and 4 comprises the contacts 5', 6' and a third electric contact 19 which is a pin biased by a leaf spring 20 so that it engages the front side of the film 3', i.e., that side which faces away from the opaque layer 4A' on the backing strip 4'. The tip of the contact 19 is not in register with the perforations 18' but engages the layer 4A' when the trailing portion or end 3A' of the film 3' is advanced beyond that portion of the film path which is adjacent to the contacts 5', 6' and 19.

The signal generating means 10' of the photographic apparatus of FIGS. 3 and 4 comprises two light-emitting diodes 21 and 22. The diode 21 is a device which furnishes signals on detection of perforations 18' and the diode 22 is a device which furnishes signals in response to detection of the trailing portion 3A' of the film 3', i.e., the visible signal which is furnished by the diode 22 denotes that the apparatus has completed the exposure of the last film frame.

The diode 21 is connected with the output of a first logic coupling circuit here shown as an AND gate 23 the first input of which is connected with the output of a second AND gate 24 and the second input of which is connected with the output of a third AND gate 25. The first input of the AND gate 24 is connected with the positive pole of a battery 28 or another suitable energy source by way of a resistor 26 and a switch 27. The second input of the gate 24 is connected with the output of a first threshold circuit 29 whose input is connected with the tap 30a of a voltage divider including a resistor 30 and that part of the layer 4A' which extends between the tips of the contacts 5', 6' when such tips extend through a perforation 18', i.e., when the tips of the contacts 5', and 6' are free to simultaneously engage the layer 4A' under the action of the respective springs 7' and 8'.

The first input of the AND gate 25 is connected with the resistor 26, the second input of this gate is connected to the output of the threshold circuit 29 and the third input of the gate 25 is connected to the output of a second threshold circuit 31 having an input connected to the tap 32a of a second voltage divider including a resistor 32 and a second resistor constituting that part of the layer 4A' which extends between the tips of the contacts 6', 19 when such contacts engage the layer 4A' behind the trailing portion or end 3A' of the film 3'.

All three contacts 5', 6', 19 of the tracking means of FIGS. 3 and 4 are disposed side-by-side, i.e., they form a file which extends transversely of the direction (arrow A) of film transport from the interior of the section 2a' toward the interior of the section 2b' of the cassette 2'. When the tips of the contacts 5' and 6' are free to engage the layer 4A' by extending through a perforation 18', the output of the threshold circuit 29 applies potential to the corresponding (second) inputs of the AND gates 24 and 25. Since the first input of the gate 24 receives a continuous voltage signal via resistor 26, the output of the gate 24 transmits a signal to the first input of the AND gate 23. The potential at the other input of the AND gate 23 is zero, i.e., the gate 23 ceases to transmit a signal whereby the diode 21 begins to furnish a visible signal which is observable by looking through the view finder 111'. The output of the AND gate 25 does not transmit a signal, i.e., the diode 22 is inactive (this diode is also observable in the view finder 111').

When the trailing portion 3A' of the film 3' advances beyond the contacts 5', 6' and 19, the contact 19 engages the layer 4A' simultaneoulsy with the other two contacts. The output of the threshold circuit 31 then transmits a voltage signal to the third input of the AND gate 25; therefore, the output of the gate 25 transmits a signal which causes the diode 22 to emit light and to thus indicate that the apparatus has completed the exposure of the last film frame. At the same time, the diode 21 ceases to emit light because the output of the AND gate 23 transmits a voltage signal. The positions of the diodes 21 and 22 are preferably selected in such a way that the user can readily interpret the meaning of the video signal which is furnished by the diode 22, i.e., that video signals furnished by the diode 21 are not confused with those furnished by the diode 22 or vice versa. Futhermore, if two different color filters are installed behind the diodes 21 and 22, the user sees a video signal of first color when the diode 21 emits light and a video signal of second color when the diode 22 emits light.

As a rule, the layer 4A or 4A' consists (either essentially or entirely) of carbon, i.e., a material whose ohmic resistance is very high. Thus, instead of utilizing photographic films which (or whose backing strips) must be provided with a special track consisting of electrically conductive material, the photographic apparatus which embodies the present invention can employ conventional films because the opaque layer of the backing strip performs the function of one (FIGS. 1–2) or more (FIGS. 3–4) resistors in voltage divider means when such layer is simultaneously engaged by a plurality of electric contacts. The ohmic resistance of the layer 4A or 4A' is in the range of one or more kiloohms, i.e., it is incomparably higher than the resistance of aforediscussed conductive tracks.

The contacts of the tracking means are preferably installed in that region where a conventional photographic apparatus contains mechanical tracking means for the perforations of photographic film. Thus, the contacts 5, 6 or 5', 6' replace conventional mechanical sensors which engage the film for the purpose of detecting an oncoming perforation. As mentioned above, it is not necessary to provide discrete biasing means for each contact of the tracking means; for example, a single leaf spring can be used to bias several contacts against that side of the film which faces away from the layer 4A or 4A'. In such apparatus, the biasing means consists of or is coated with insulating material, i.e., the biasing means does not form part of conductor means which connect the contacts with the signal generating circuit arrangement 10 or 10'.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. In a photographic apparatus wherein a web of photographic film is transported in a predetermined direction along a predetermined path, together with a backing strip carrying an opaque layer having a high ohmic resistance and facing one side of the film and wherein at least one portion of the film affords access to said layer from the other side of the film the combination of tracking means adjacent to a portion of said path and including two spaced-apart electric contacts at least one of which engages the other side of the film in line with said film portion and both of which simultaneously engage said layer when said film portion is adjacent thereto whereby that part of said layer which extends between said contacts, while said contacts simultaneously engage said layer, constitutes a resistor; and means for generating signals in response to simultaneous engagement of said contacts with said layer.

2. The combination of claim 1, wherein said layer is opaque and each of said contacts normally engages said other side of the film in said path.

3. The combination of claim 1, wherein said portion of the film includes the trailing end thereof and said layer extends rearwardly beyond said trailing end so that said contacts simultaneously engage said layer when said trailing end is transported beyond said portion of said path.

4. The combination of claim 1, wherein said portion of the film includes a series of perforations forming a row which extends in said direction and both said contacts engage the other side of the film in line with said row of perforations, said contacts being sufficiently close to each other to extend through a perforation and simultaneously engage said layer when such perforation enters said portion of said path.

5. The combination of claim 4, wherein each of said perforations has a predetermined length, as considered in said direction, said contacts being located one behind the other, as considered in said direction, and the distance between said contacts being less than said predetermined length.

6. The combination of claim 4, wherein each of said perforations has a predetermined width, as considered transversely of said direction, said contacts being disposed side-by-side, as considered transversely of said direction, and the distance between said contacts being less than said predetermined width.

7. The combination of claim 4, further comprising means for yieldably biasing said contacts against said other side of the film in said path.

8. The combination of claim 4, wherein said signal generating means comprises an evaluating circuit which is completed in response to simultaneous engagement of said contacts with said layer.

9. The combination of claim 8, wherein said evaluating circuit comprises a threshold circuit having an input and an output, said signal generating means further comprising a voltage divider having a tap connected to said input, first resistor means constituting said part of said layer, and second resistor means.

10. The combination of claim 9, wherein said signal generating means further comprises an energy source, conductor means directly connecting one of said contacts with one pole of said source, a device for furnishing said signals, and at least one logic circuit coupling said output with said device.

11. The combination of claim 1, further comprising means for transporting the film along said path, said signal generating means being operative to change the condition of said film transporting means in response to simultaneous engagement of said contacts with said layer.

12. The combination of claim 1, wherein said signal generating means includes means for furnishing visible signals.

13. The combination of claim 1, further comprising a container for said film and said backing strip.

14. In a photographic apparatus wherein a web of photographic film having a trailing end is transported in a predetermined direction along a predetermined path, wherein a layer having a high ohmic resistance is adjacent to one side of the film and extends rearwardly beyond said trailing end, and wherein at least one portion of the film includes a series of perforations affording access to said layer from the other side of the film and forming a row which extends in said direction, the combination of tracking means adjacent to a portion of said path and including two spaced-apart electric contacts both of which engage the other side of the film in line with said row of perforations, said two contacts being sufficiently close to each other to extend through a perforation and simultaneously engage said layer when such perforation enters said portion of said path whereby that part of said layer which extends between said two contacts while said two contacts simultaneously engage said layer constitutes a resistor, said tracking means further including a third contact which engages the other side of the film and engages the layer simultaneously with one of said first mentioned contacts on transport of the trailing end beyond said portion of said path whereby a second part of said layer between said third contact and said one contact constitutes a second resistor; and means for generating signals in response to simultaneous engagement of said contacts with said layer, including a device for furnishing a first signal on simultaneous engagement of said first mentioned contacts with said layer and a device for furnishing a second signal on simultaneous engagement of said third contact and said one contact with said layer.

15. The combination of claim 14, wherein at least one of said devices includes means for furnishing visible signals.

* * * * *

UNITED STATES PATENT AND TRADEMARK OFFICE
CERTIFICATE OF CORRECTION

PATENT NO. : 4,176,927

DATED : December 4, 1979

INVENTOR(S) : Eduard WAGENSONNER

It is certified that error appears in the above-identified patent and that said Letters Patent are hereby corrected as shown below:

Page 1, Item [30], "Jan. 21, 1977" should read
--Jan. 26, 1977--.

Signed and Sealed this

Twenty-first Day of October 1980

[SEAL]

Attest:

Attesting Officer

SIDNEY A. DIAMOND

Commissioner of Patents and Trademarks